UNITED STATES PATENT OFFICE.

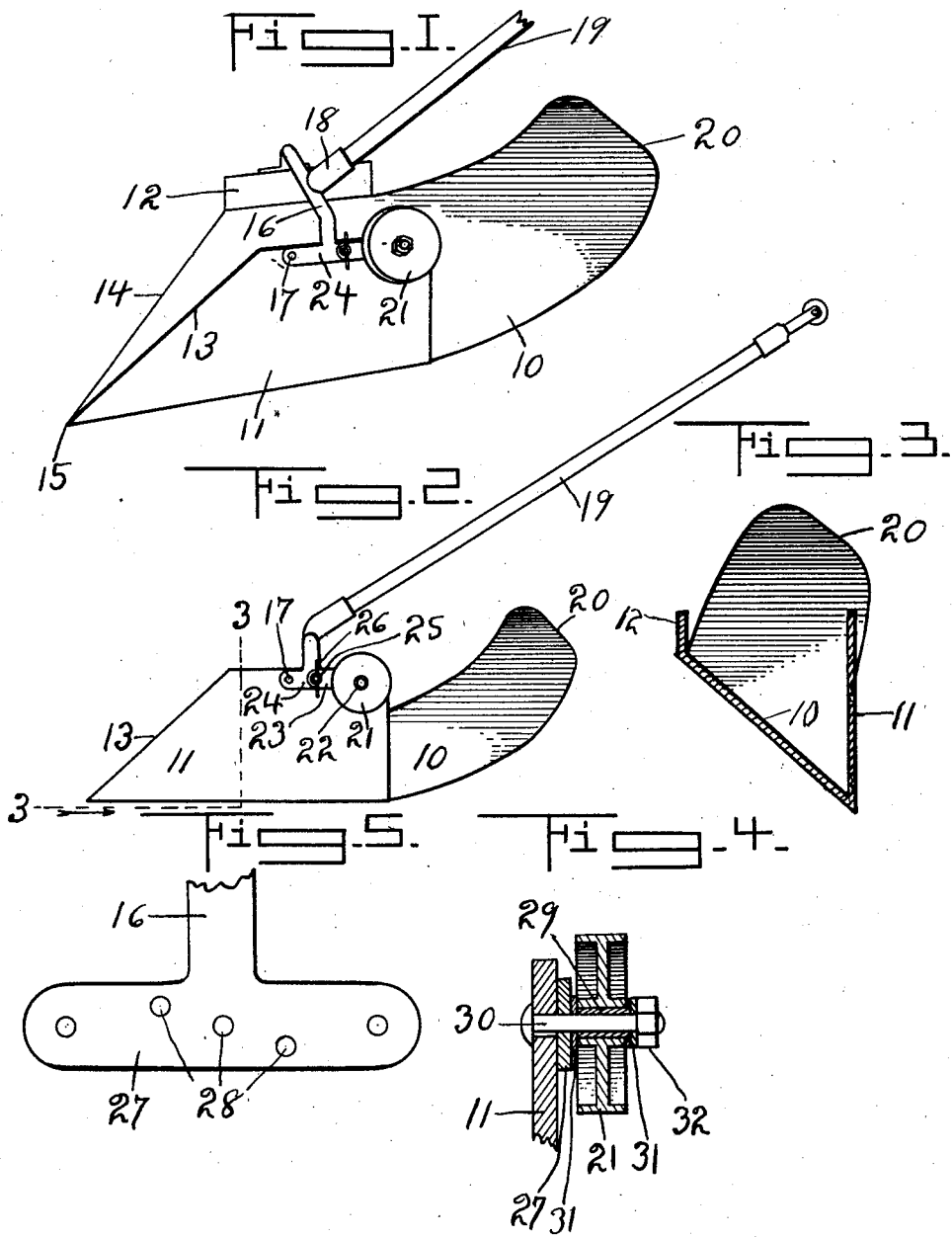

FRANK J. VONDRACEK, OF CEDAR RAPIDS, IOWA.

LAWN-EDGER.

998,055.   Specification of Letters Patent.   Patented July 18, 1911.

Application filed October 18, 1910. Serial No. 587,779.

*To all whom it may concern:*

Be it known that I, FRANK J. VONDRACEK, a citizen of the United States of America, residing at Cedar Rapids, in the county of Linn and State of Iowa, have invented certain new and useful Improvements in Lawn-Edgers, of which the following is a specification, reference being had therein to the accompanying drawing.

This invention relates to improvements in lawn edgers.

The object of the invention is the provision of an implement which may be employed by hand for easily cutting sod and especially the sod along the edges of a lawn for the purpose of giving the same a substantially straight or vertical edge of finished appearance.

A further object of the invention is to provide such an implement with a means for adjusting the depth of the cutting portion thereof and adapted to remove the cut sod rearwardly and to one side of the line of travel of the implement. The implement is also adapted to cut out a strip of sod of a predetermined width and any length desired and while being more especially designed for cutting sod, it will be apparent that the same may be employed for other uses such as clay cutting or ditch making.

With these general objects in view and others that will appear as the nature of the invention is better understood, the same consists in the novel combination and arrangement of parts hereinafter fully described, illustrated in the accompanying drawings and pointed out in the appended claims.

In the drawings forming a part of this application and in which like numerals of reference correspond to similar parts throughout the several views, Figure 1 is a perspective view of the invention with a handle thereof partly broken away. Fig. 2 is a side elevation of the invention. Fig. 3 is a vertical transverse section taken upon line 3—3 of Fig. 2. Fig. 4 is a detail view illustrating a modified manner of mounting the adjustable guide wheel upon the implement, and Fig. 5 is a fragmentary view showing the base member of the yoke employed in the form shown in Fig. 4.

Referring more specifically to the drawing, it will be noted that the mold board 10 is formed integrally with the two side members 11 and 12, the latter being arranged parallel to each other and assuming a vertical position when the implement is in active operation, while the portion of the mold board therebetween lies obliquely between said two sides as best illustrated in Figs. 1 and 2 of the drawings.

The positioning of the implement as above set forth places the top edges of the sides 11 and 12 in substantially the same horizontal plane, although the height of the side 11 is much greater than that of the side 12, it being noted that the sharpened front oblique edges 13 and 14, respectively, of the side 11 and mold board 10 constitute the cutting members of the implement, such members meeting in a sharpened point 15 rendering possible an easy entrance of the implement into the sod to be operated upon.

The malleable iron yoke 16 is secured to said sides 11 and 12 by such hold fast devices as the rivets 17. This yoke rigidly retains the carrying sides in parallel relation and is provided with a socket 18 for the reception of a suitable operating handle 19 by which the implement is forcibly impelled through the sod. The rear portion 20 of the mold board is permanently bent sidewise toward and beyond the line of the side 11 as shown in Fig. 3, which turns the sod which has been cut by the implement, over to that side of the furrow or cut, said end also being higher than the tops of the sides.

A gage wheel 21 is journaled upon a stud 22 carried by an arm 23 adjustably pivoted to the base 24 of the yoke 16 by means of a bolt 25, while the arm is maintained in any desired pivoted position by the winged set nut 26. By this arrangement it is evident that a swinging of the arm upon the bolt 25 and its adjustment thereon will position the gage wheel 21 different heights from the bottom of the mold board and thus determine the depth of the cut to be made by the implement, as said wheel 21 is adapted to run upon the top of the sod or ground.

The modified form of adjusting means for the gage wheel, shown in Figs. 4 and 5, provides the same yoke as shown in the other constructions with the exception that the base 27 thereof is provided with a series of perforations 28 either vertically or obliquely arranged, which perforations register with similar ones (not shown) provided in the side 11. In this construction the gage wheel 21 is journaled upon a sleeve 29 which is in turn mounted upon the bolt 30 threaded through either of the openings 28 of the yoke base. Although the invention broadly contemplates the mounting of the bearing for said gage wheel in either of the openings 28, the provision of the sleeve 29 and the oppositely positioned washers 31 all of which are held in their assembled relations by the nut 32 has been found to be the most advisable.

While the forms of the invention hereinafter shown and described are what are believed to be the preferable embodiments thereof, it is nevertheless to be understood that changes may be made in form, size and the minor details of construction without departing from the spirit and scope of the invention as set forth in the appended claims.

Having thus fully described my invention and in what manner the same is designed for use, what I claim and desire to secure by Letters Patent of the United States is:

1. A device of the class described comprising two sides of different heights and arranged parallel to each other, a mold board integral with said sides and obliquely positioned between the same, sharpened cutting edges provided upon the front of the higher of said sides and the mold board and said edges meeting in a bottom cutting point, the rear end of the mold board being bent above the plane of the top of said sides and toward the higher side, a rigid yoke connecting the tops of said sides, an operating handle and a gage wheel adjustable in height secured thereto.

2. A device of the class described comprising two sides of different heights and arranged parallel to each other, a mold board integral with said sides and obliquely positioned between the same, sharpened cutting edges provided upon the front of the higher of said sides and the mold board and said edges meeting in a bottom cutting point, the rear end of the mold board being bent above the plane of the top of said sides and toward the higher side, a rigid yoke secured to said sides, a socket provided upon said yoke, an operating handle secured in said socket, an arm pivoted to said yoke, a gage wheel mounted upon one end of said arm and an adjusting nut provided upon the other end thereof.

In testimony whereof I affix my signature in the presence of two witnesses.

FRANK J. VONDRACEK.

Witnesses:
A. H. CONN,
FRANK O. MEKOTA.

---

Copies of this patent may be obtained for five cents each, by addressing the "Commissioner of Patents, Washington, D. C."